(12) United States Patent
Ogawa et al.

(10) Patent No.: US 6,999,905 B2
(45) Date of Patent: Feb. 14, 2006

(54) METHOD FOR EXTRACTING SIGNIFICANT SIGNAL, RECORDING MEDIUM AND PROGRAM

(75) Inventors: Ryuta Ogawa, Moriguchi (JP); Hiroaki Oka, Hirakata (JP); Nobuhiko Ozaki, Ikoma (JP); Hirokazu Sugihara, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 415 days.

(21) Appl. No.: 10/296,007

(22) PCT Filed: Apr. 26, 2002

(86) PCT No.: PCT/JP02/04302

§ 371 (c)(1),
(2), (4) Date: Nov. 20, 2002

(87) PCT Pub. No.: WO02/088635

PCT Pub. Date: Nov. 7, 2002

(65) Prior Publication Data

US 2003/0125887 A1 Jul. 3, 2003

(51) Int. Cl.
*G06F 15/00* (2006.01)

(52) U.S. Cl. .......................... 702/189; 702/32; 702/69; 714/100; 714/34; 700/90; 700/266; 340/572.4; 708/806

(58) Field of Classification Search .................. 702/32, 702/69, 74, 106, 110, 189–194; 714/100, 714/34; 700/90, 266; 340/572.4; 708/806
See application file for complete search history.

(56) References Cited

U.S. PATENT DOCUMENTS 3,763,361 A * 10/1973 Smart .......................... 708/806
3,952,185 A * 4/1976 Stultz et al. .................. 708/806
4,144,578 A * 3/1979 Mueller et al. ............. 702/199
5,170,359 A * 12/1992 Sax et al. ...................... 702/73
6,078,281 A * 6/2000 Milkovich et al. .......... 342/196

FOREIGN PATENT DOCUMENTS

| JP | 5-34263 | 2/1993 |
| JP | 11-142408 | 5/1999 |
| JP | 2001-41955 | 2/2001 |
| WO | 97/27318 | 7/1997 |

OTHER PUBLICATIONS

Wagdy et al., 'Effect of Sampling Jitter on Some Sinewave Measurements', Apr. 1989, IEEE, pp. 195–198.*

Perunicic et al., 'New Digital Signal Processing Approach to the Design of the Algorithms for Frequency Deviation Measurement', Nov. 1990, IEEE, pp. 17–22.*

* cited by examiner

*Primary Examiner*—Marc S. Hoff
*Assistant Examiner*—Elias Desta
(74) *Attorney, Agent, or Firm*—Snell & Wilmer, LLP

(57) ABSTRACT

A method for extracting a signal of interest from a signal generated from at least one subject, comprises the steps of (A) obtaining a time-series signal generated from the subject as a data group consisting of a plurality of pieces of data, (B) obtaining a plurality of extracted data groups from the data group, wherein each extracted data group comprises a predetermined number of pieces of data selected from the data group, (C) calculating standard deviations of the plurality of extracted data groups to obtain a standard deviation group, and (D) referencing each standard deviation included in the standard deviation group and selecting the signal of interest.

19 Claims, 14 Drawing Sheets

FIG. 12

(Column)
Number of base replacements
0 1 2 3 4 5

(Row) DNA fragment
A
B
C
D
E
F
G
H

METHOD FOR EXTRACTING SIGNIFICANT SIGNAL, RECORDING MEDIUM AND PROGRAM

TECHNICAL FIELD

The present invention relates to a method for processing a signal generated from a subject. More particularly, the present invention relates to a method for extracting a signal of interest from a signal generated from a subject. The present invention also relates to a method for obtaining and categorizing a significant signal. The method of the present invention can be applied to measurement and categorization of the total channel activity of a whole cell. The method of the present invention can also be applied to drug screening, DNA diagnostics, SNP analysis, and functional analysis for protein.

BACKGROUND ART

Conventionally, an electrical change of a biological sample associated with the activity thereof or the strength of fluorescence emitted by an indicator taken up by a biological sample is captured as a digital signal and measured by a measurement apparatus. For example, the ion channel activity of a cell is measured as follows. In the case of measurement at a single channel level, an electrophysiological measurement apparatus employing a micro-electrode probe (e.g., a patch clamp) and a specialized control apparatus is used to obtain a digital signal (the amount of electricity passing through a channel). From the digital signal, the measurement apparatus calculates the duration, timing, number of times, and the like of opening or closing of the ion channel to determine the activity of the channel (intracellular recording method). In the case of a whole cell, a fluorescence measurement technique is used to determine the amount of ions entering into the cell as a digital signal, and regarded as the ion channel activity of the whole cell.

However, when a captured signal is particularly a digital signal, it is difficult to distinguish a signal of interest from noise signals and therefore it is not possible to detect a change in the activity of a channel associated with the activity of a cell, and the like.

In the patch clamp technique, a micromanipulator requiring a high skill for manipulating is necessary, and it takes much time to measure one sample. Therefore, it is difficult to measure a large number of samples. In the fluorescence measurement technique, a subject to be detected is limited only to ions emitting fluorescence, or when a change in the ion channel activity of a cell is measured in the presence or absence of a chemical substance, such as a drug, or while varying the concentration of the chemical substance, it is necessary to additionally employ a fluorescent material. In this case, unfortunately, the fluorescent material probably has a side effect on a subject and the fluorescence sensitivity of a fluorescent material changes over time.

DISCLOSURE OF THE INVENTION

The present invention is provided to solve the conventional problems described above. The object of the present invention is to provide a method for extracting a signal of interest from a signal containing a noise signal and the signal of interest, which are conventionally difficult or impossible to distinguish, obtaining a significant signal from a subject based on the signal of interest, and categorizing the significant signal.

The term "signal of interest" as used herein refers to a signal generated by a subject, such as representatively a cell and a nucleic acid, specifically a signal emitted from a specific site, such as an ion channel of a cell out, or a signal changed due to a specific event in a subject, such as activation of an ion channel of a cell in response to a drug and formation of a double stranded sequence by hybridization of nucleic acids.

The term "significant signal" as used herein refers mainly to the latter meaning, i.e., a signal changed due to a specific event in a subject.

With the method of the present invention, a simple measurement probe which does not necessarily require a specialized control apparatus can be used to easily measure the total channel activities of a whole cell in a short time, and no chemical substance is required, so that a side effect or a change in fluorescence sensitivity over time does not have to be considered. It is also possible to categorize a response from a tested sample and a drug and to screen drugs.

According to one aspect of the present invention, a method for extracting a signal of interest from a signal generated from at least one subject, comprises the steps of (A) obtaining a time-series signal generated from the subject as a data group consisting of a plurality of pieces of data, (B) obtaining a plurality of extracted data groups from the data group, wherein each extracted data group comprises a predetermined number of pieces of data selected from the data group, (C) calculating standard deviations of the plurality of extracted data groups to obtain a standard deviation group, and (D) referencing each standard deviation included in the standard deviation group and selecting the signal of interest.

In one embodiment, the referencing in the step (D) may be to calculate an average of the standard deviations included in the standard deviation group.

In one embodiment, the referencing in the step (D) may be to divide the standard deviations into a plurality of classes having a predetermined width of standard deviation as a unit, plot each standard deviation on a coordinate system having an axis representing the class and another axis representing the number of the standard deviations present in each class, approximate a resultant graph to a normal distribution, and calculate an average, half-width and variance, or standard deviation of the resultant normal distribution.

In one embodiment, the method may further comprise performing the steps (B) to (C) a plurality of times while changing the number of pieces of data included in the extracted data group.

In one embodiment, the method may further comprises performing the steps (B) to (D) a plurality of times while changing the number of pieces of data included in the extracted data group and the width of the class. The signal of interest may be selected from averages, half-widths and variances or standard deviations of a plurality of resultant normal distributions.

In one embodiment, after the step (A), the method may further comprise adding up a data group obtained for each of the plurality of subjects.

In one embodiment, after the step (A), the method further may comprise subtracting a data group obtained for each of the plurality of subjects.

In one embodiment, before the step (A), the method may further comprise simultaneously stimulating each of the plurality of subjects.

In one embodiment, the referencing in the step (D) may be to divide the standard deviations into a plurality of classes having a predetermined width of standard deviation as a unit, plot each standard deviation on a coordinate system having an axis representing the class and another axis representing the number of the standard deviations present in each class, approximate a resultant graph by curvilinear approximating analysis selected from the group consisting of exponential decreasing analysis, exponential increasing analysis, Gaussian distribution, Lorentz distribution, σ analysis, multiple peak analysis, and nonlinear analysis, and obtain gradients before and after a peak on a resultant approximated curve.

In one embodiment, the selection in the step (B) may be performed in a time-series manner.

In one embodiment, the steps (B) to (D) maybe repeated, the selection in the step (B) maybe performed in a time-series manner, and the method may further comprise selecting a first piece of data in the extracted data group with a predetermined time lag in each repetition and comparing averages of the standard deviation groups obtained in the repetitions.

In one embodiment, the steps (B) to (D) may be repeated, the selection in the step (B) maybe performed in a time-series manner, and the method may further comprises selecting a first piece of data in the extracted data group with a predetermined time lag in each repetition and comparing averages of normal distributions of the standard deviation groups obtained in the repetitions.

In one embodiment, the steps (B) to (D) maybe repeated, the selection in the step (B) may be performed in a time-series manner, and the method may further comprises selecting a first piece of data in the extracted data group with a predetermined time lag in each repetition and comparing half-widths, variances or standard deviations of normal distributions of the standard deviation groups obtained in the repetitions.

In one embodiment, the referencing in the step (D) may comprise obtaining a plurality of extracted standard deviation groups from the standard deviation group, each extracted standard deviation group comprising a predetermined number of standard deviations selected from the standard deviation group in a time-series manner. The method may further comprise the steps of calculating an average of the predetermined number of standard deviations and a time-series increase rate of the average, comparing the resultant average of each extracted standard deviation group with a predetermined set value, identifying a time (a) of generation of a time-series signal corresponding to the standard deviation group having an average greater than or equal to the set value, identifying a time (b) of generation of a time-series signal corresponding to the standard deviation group having a time-series increase rate of an average of extracted standard deviation group after the time (a) smaller than or equal to the set value, and obtaining a significant signal based on the generation times (a) and (b).

In one embodiment, the subject may be a cell, and the signal of interest may be a signal associated with activation of an ion channel or a receptor, or actuation of an intracellular signal transduction system.

In one embodiment, the subject may be a cell, and the signal of interest may be a significant signal generated from the cell responsive to a test chemical substance, the step (A) may be performed either in the presence of a standard chemical substance having a known action to the cell or in the presence of the test chemical substance, and the method may further comprise comparing the average obtained in the presence of the standard chemical substance with the average obtained in the presence of the test chemical substance.

In one embodiment, the subject may be a cell, and the signal of interest may be a significant signal generated from the cell responsive to a test chemical substance, the step (A) may be performed either in the presence of a standard chemical substance having a known action to the cell or in the presence of the standard chemical substance and the test chemical substance, and the method may further comprise comparing the average obtained in the presence of the standard chemical substance with the average obtained in the presence of the standard chemical substance and the test chemical substance.

The above-described standard chemical substance include a stimulant or an inhibitor for a subject cell.

In one embodiment, the subject may be nucleic acid, and the signal of interest may be a significant signal associated with formation of double stranded nucleic acid.

According to another aspect of the present invention, a computer-readable recording medium is provided, which stores a program for executing the procedures of (A) obtaining a time-series signal generated from the subject as a data group consisting of a plurality of pieces of data, (B) obtaining a plurality of extracted data groups from the data group, wherein each extracted data group comprises a predetermined number of pieces of data selected from the data group, (C) calculating standard deviations of the plurality of extracted data groups to obtain a standard deviation group, and (D) referencing each standard deviation included in the standard deviation group and selecting the signal of interest.

According to another aspect of the present invention, a program is provided for causing a computer to execute the procedures of (A) obtaining a time-series signal generated from the subject as a data group consisting of a plurality of pieces of data, (B) obtaining a plurality of extracted data groups from the data group, wherein each extracted data group comprises a predetermined number of pieces of data selected from the data group, (C) calculating standard deviations of the plurality of extracted data groups to obtain a standard deviation group, and (D) referencing each standard deviation included in the standard deviation group and selecting the signal of interest.

Figure 5:
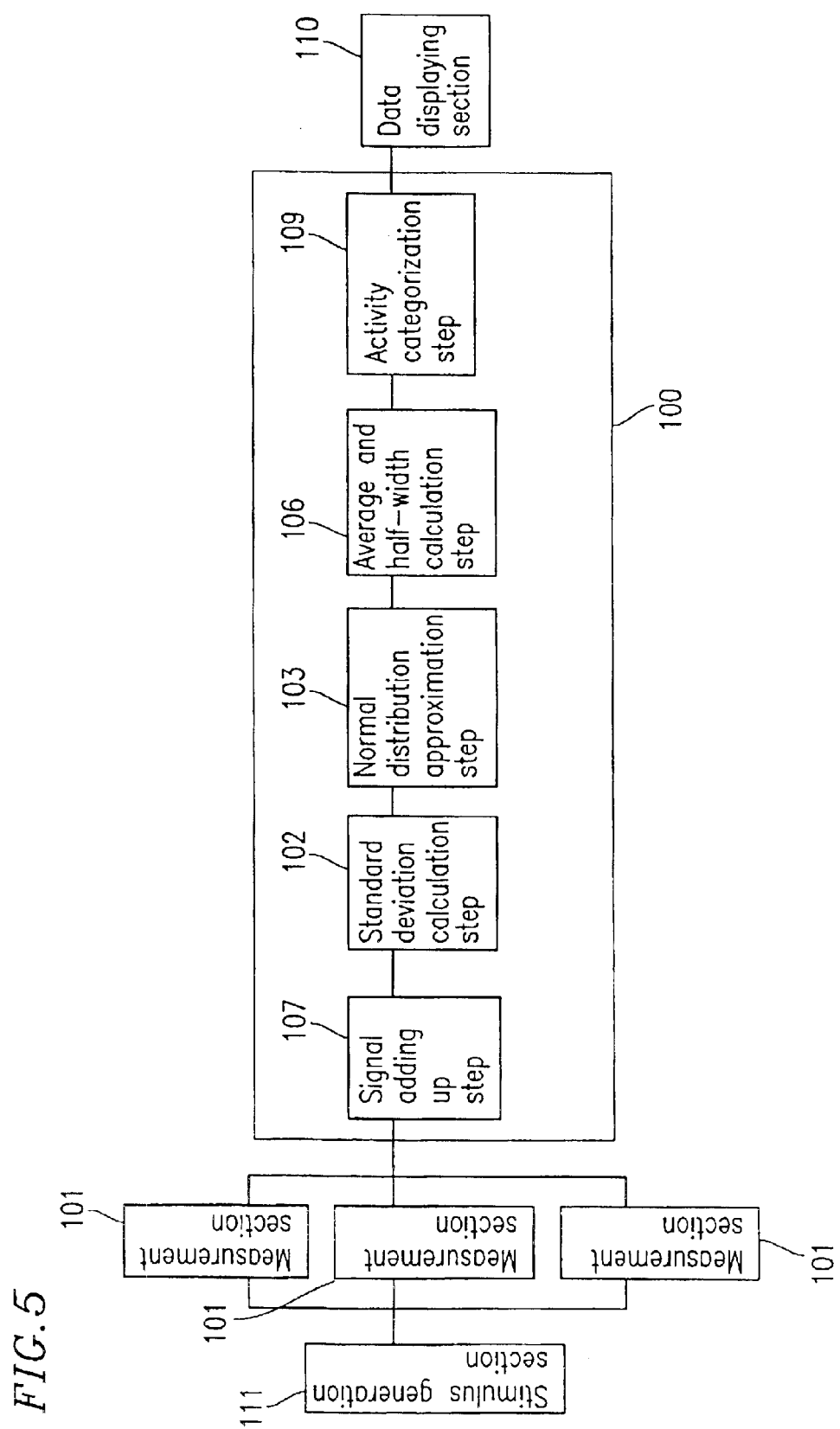

FIG. 5 is a schematic diagram showing a configuration of an apparatus and steps used in measurement of ion channel activities of a cell described in still another example of the present invention. Reference numerals in the figure indicate the following: 100 computer; 101 measurement section; 102 standard deviation calculation step; 103 normal distribution approximation step; 106 average and half-width calculation step; 107 signal adding up step; 109 activity categorization step; 110 data displaying section; and 111 stimulus generation section.

Figure 6:
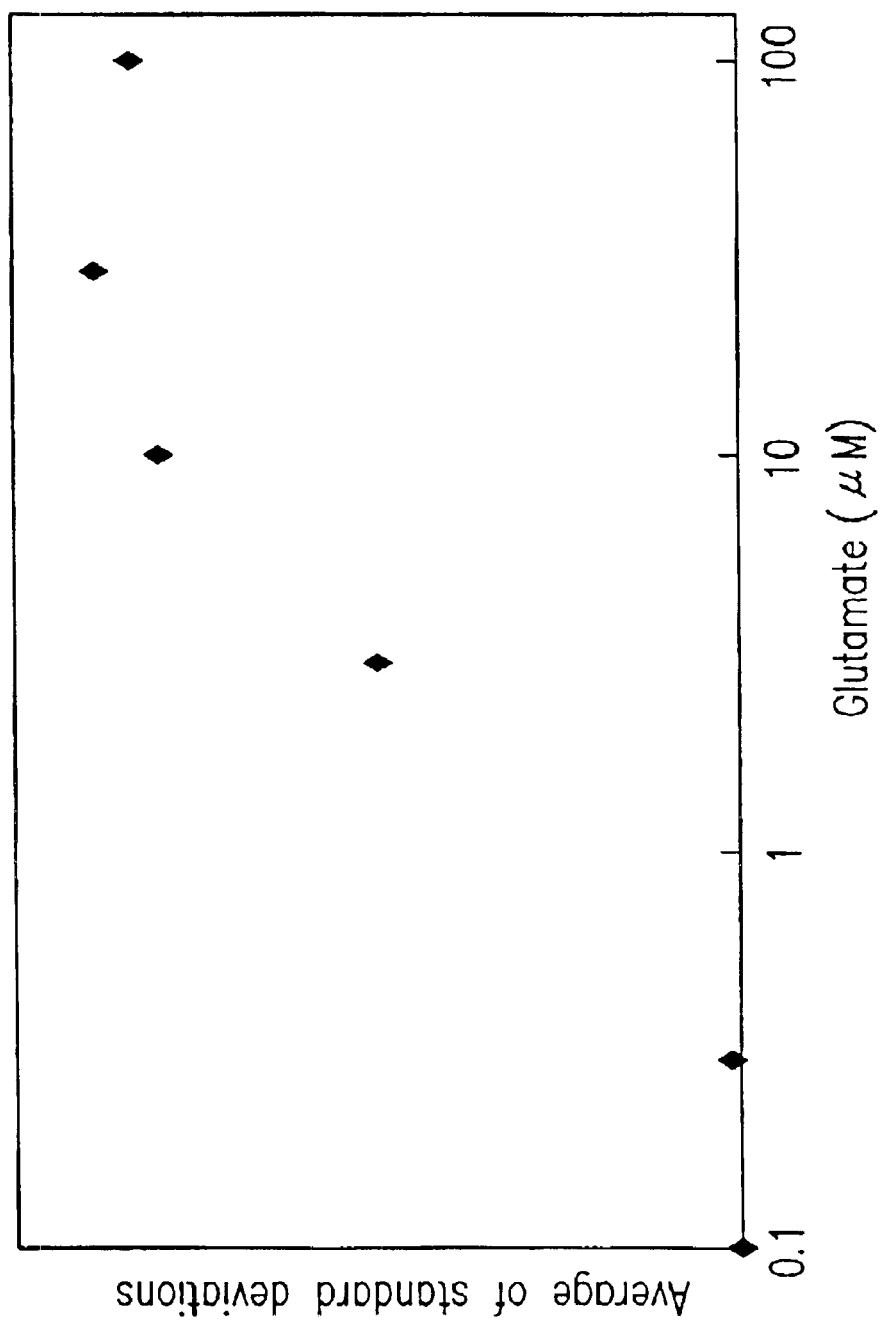

FIG. 6 is a diagram showing a result of measuring a response of a neuron prepared from *Lymnaea stagnails* to different glutamate concentrations in accordance with the method of the present invention.

Figure 7:
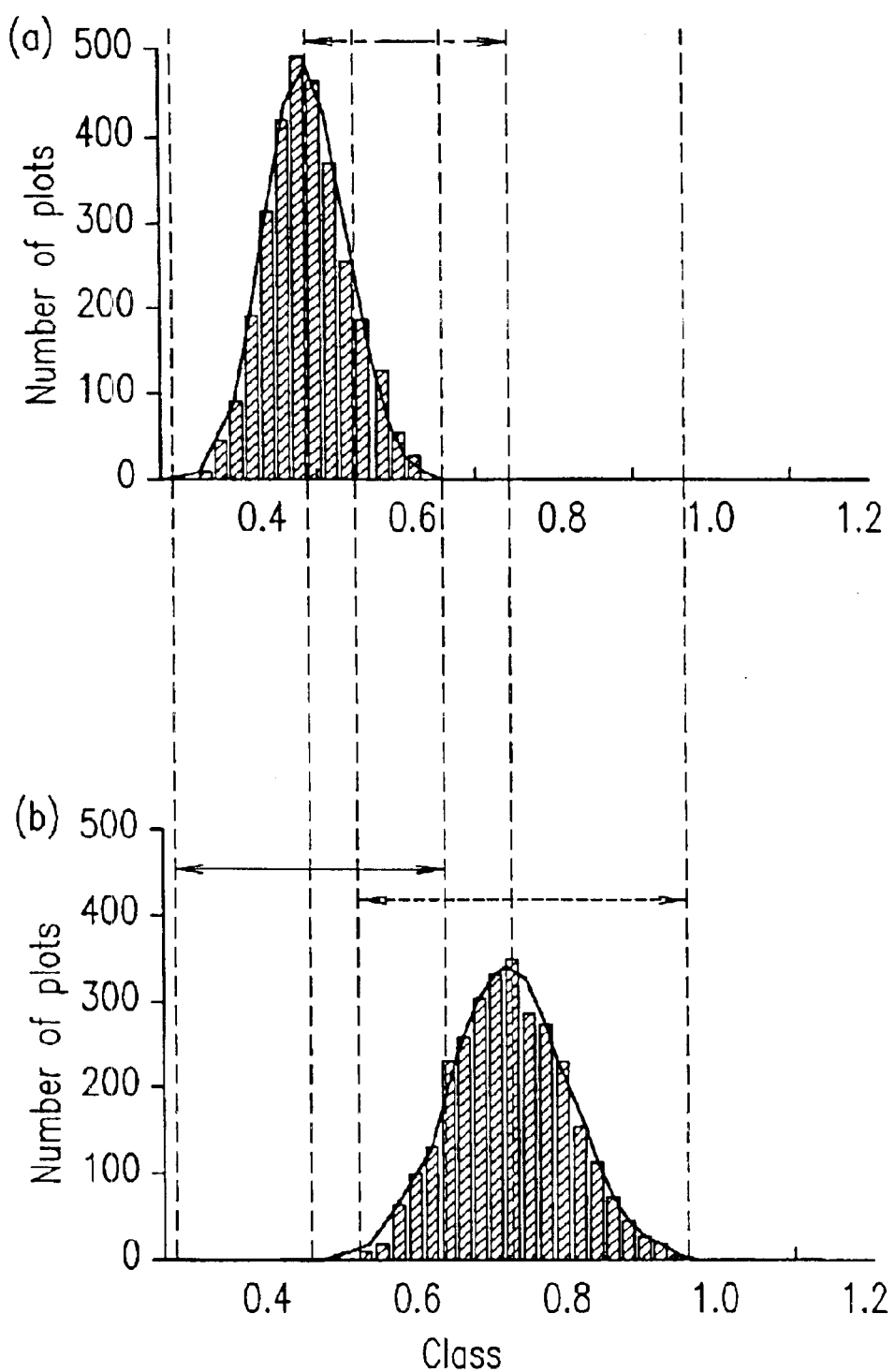

FIG. 7 is a diagram showing a result of measuring an extracellular recording response of a neuron prepared from *Lymnaea stagnails* to application of glutamate in accordance with the method of the present invention.

Figure 8:
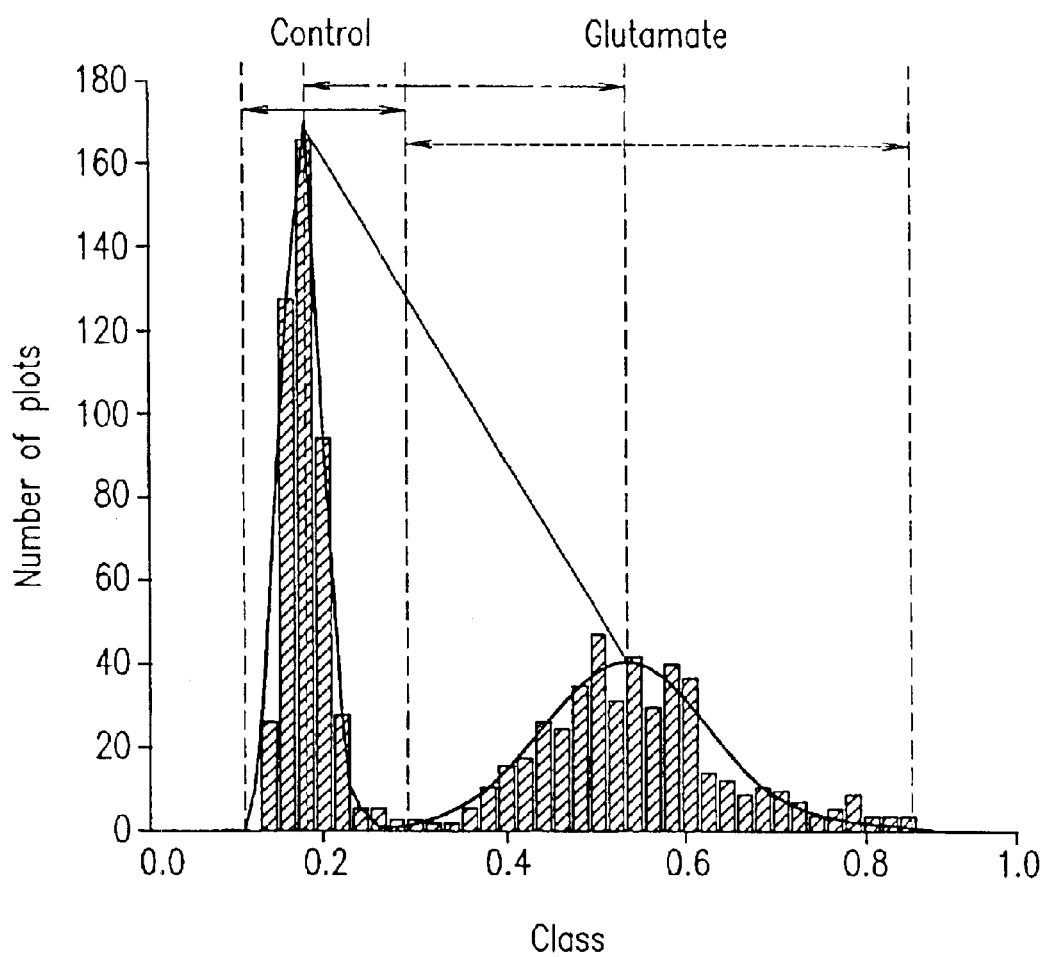

FIG. 8 is a diagram showing a result of measuring an intracellular recording response of a neuron prepared from *Lymnaea stagnails* to application of glutamate in accordance with the method of the present invention.

Figure 9:
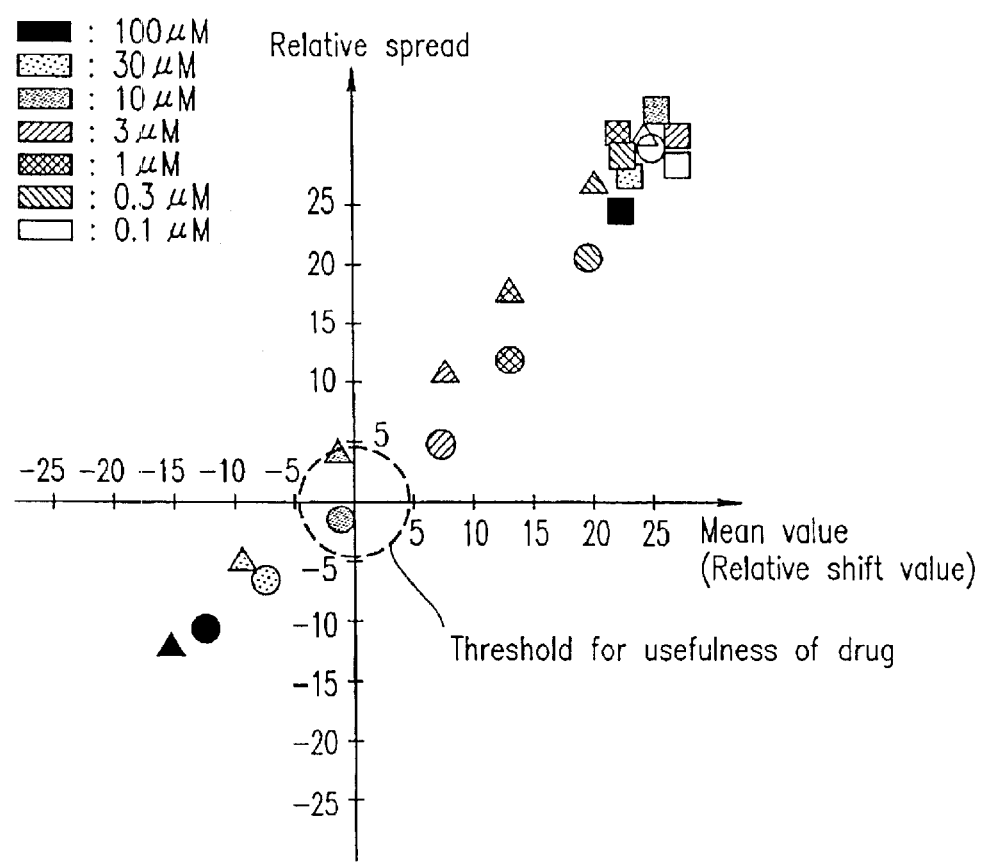

FIG. 9 is a diagram showing a result of categorizing a test drug based on a database of a change in ion channel activity of a cell due to nifedipine in the present invention.

Figure 10:
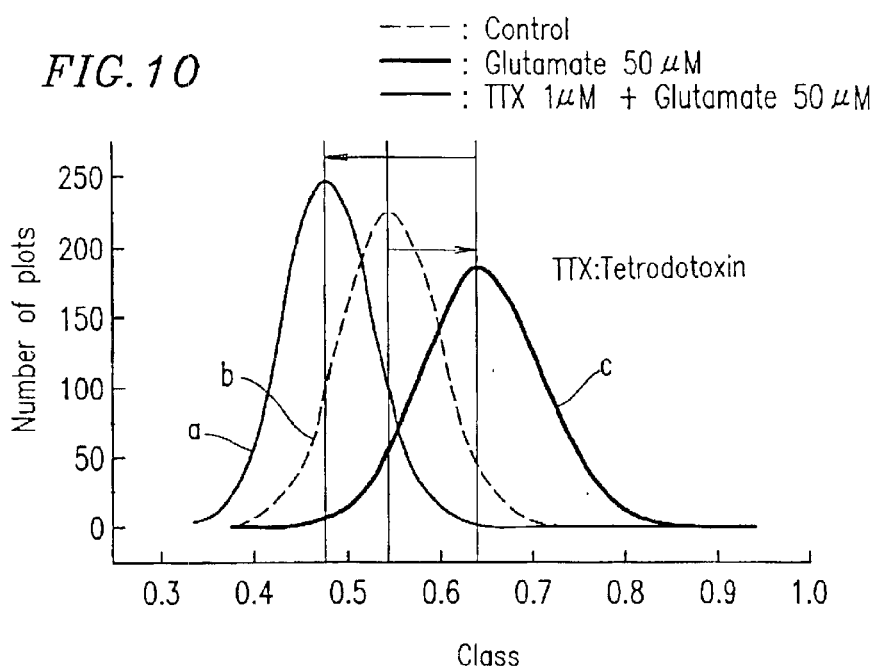

FIG. 10 is a diagram showing a result of measuring a response of a neuron prepared from *Lymnaea stagnails* to application of glutamate and TTX in accordance with the method of the present invention.

Figure 11:
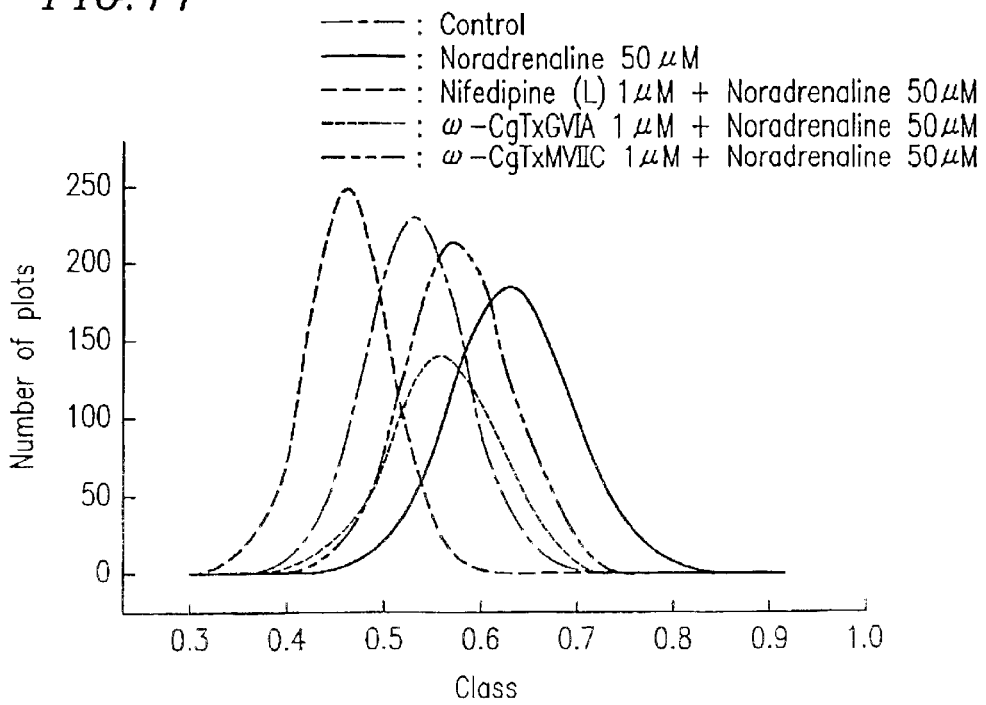

FIG. 11 is a diagram showing a result of measuring a response of a smooth muscle cell treated with different Ca channel inhibitors in accordance with the method of the present invention.

FIG. 12 is a diagram showing an arrangement of DNA probes having different numbers of base replacements as subjects of the present invention, described in an example.

Figure 13:
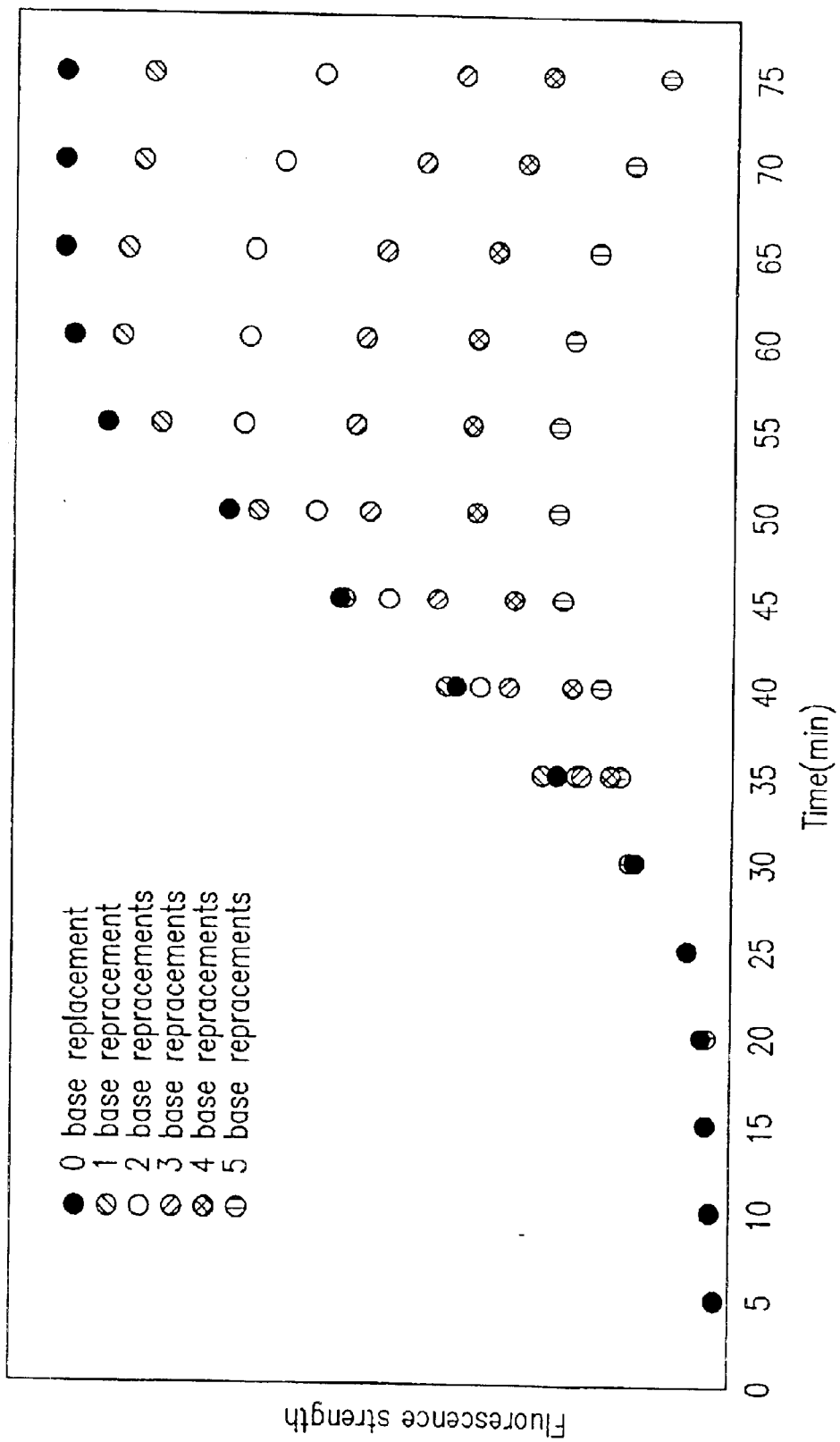

FIG. 13 is a diagram showing a result of measuring fluorescence strength over time, when hybridization of DNA probes having different numbers of base replacements as subjects was conducted at different temperatures, by the method of the present invention.

Figure 14:
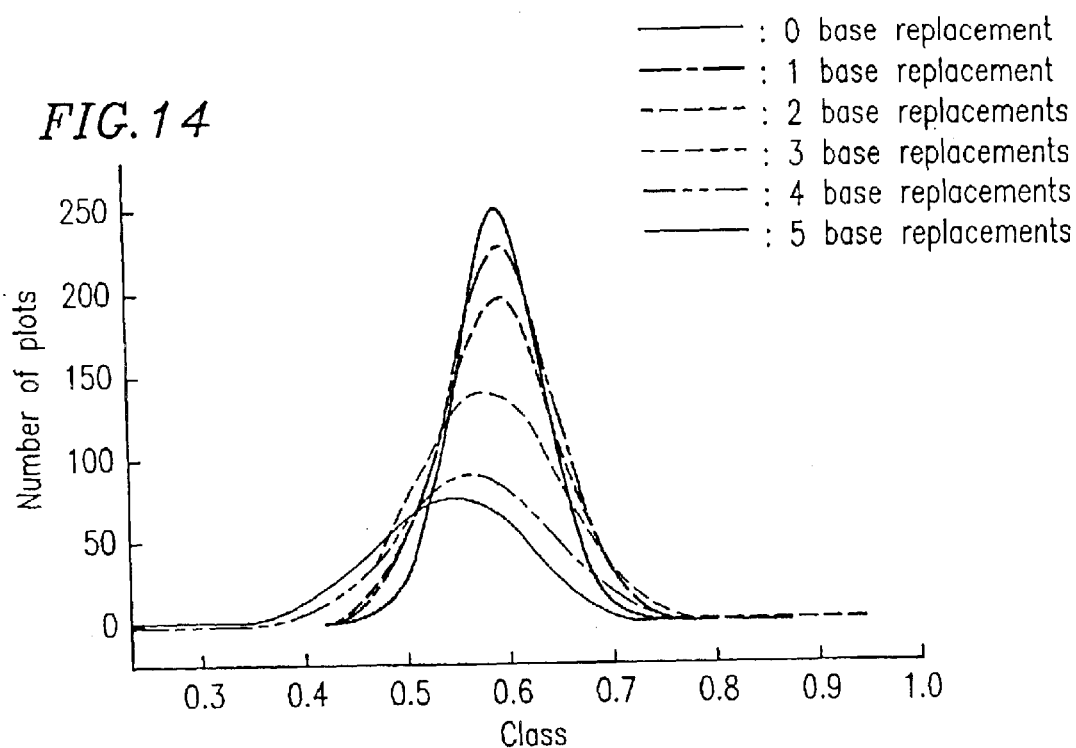

FIG. 14 is a diagram showing a result of measuring fluorescence strength, when hybridization of DNA probes having different numbers of base replacements as subjects was conducted, by the method of the present invention, where the fluorescence strength is plotted depending on the number of base replacements.

Figure 15:
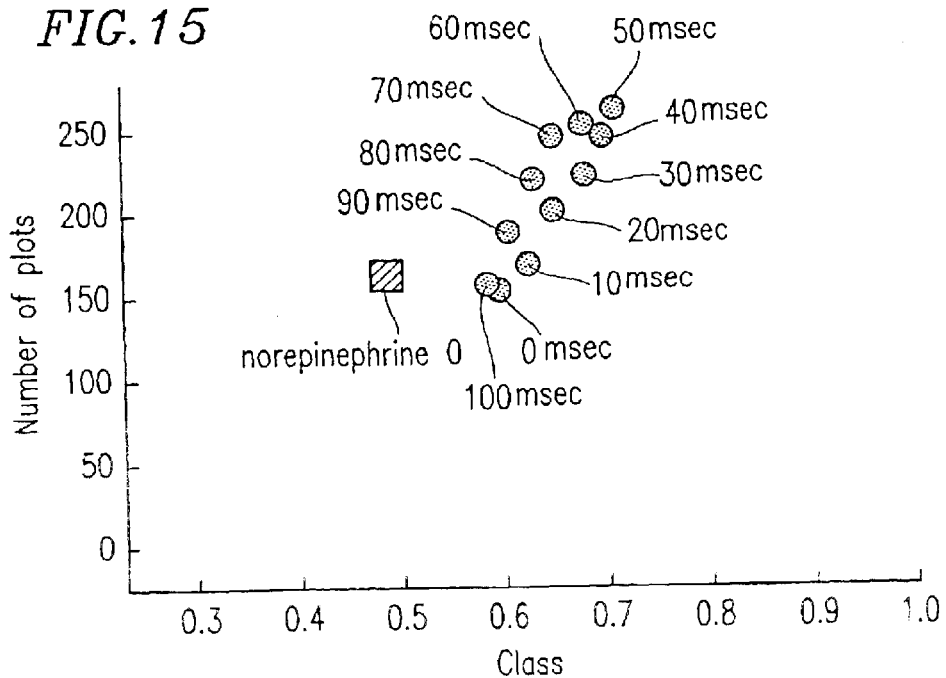

FIG. 15 is a graph on which a response of a smooth muscle cell to norepinephrine obtained as a significant signal in accordance with the method of the present invention is plotted.

Figure 16:
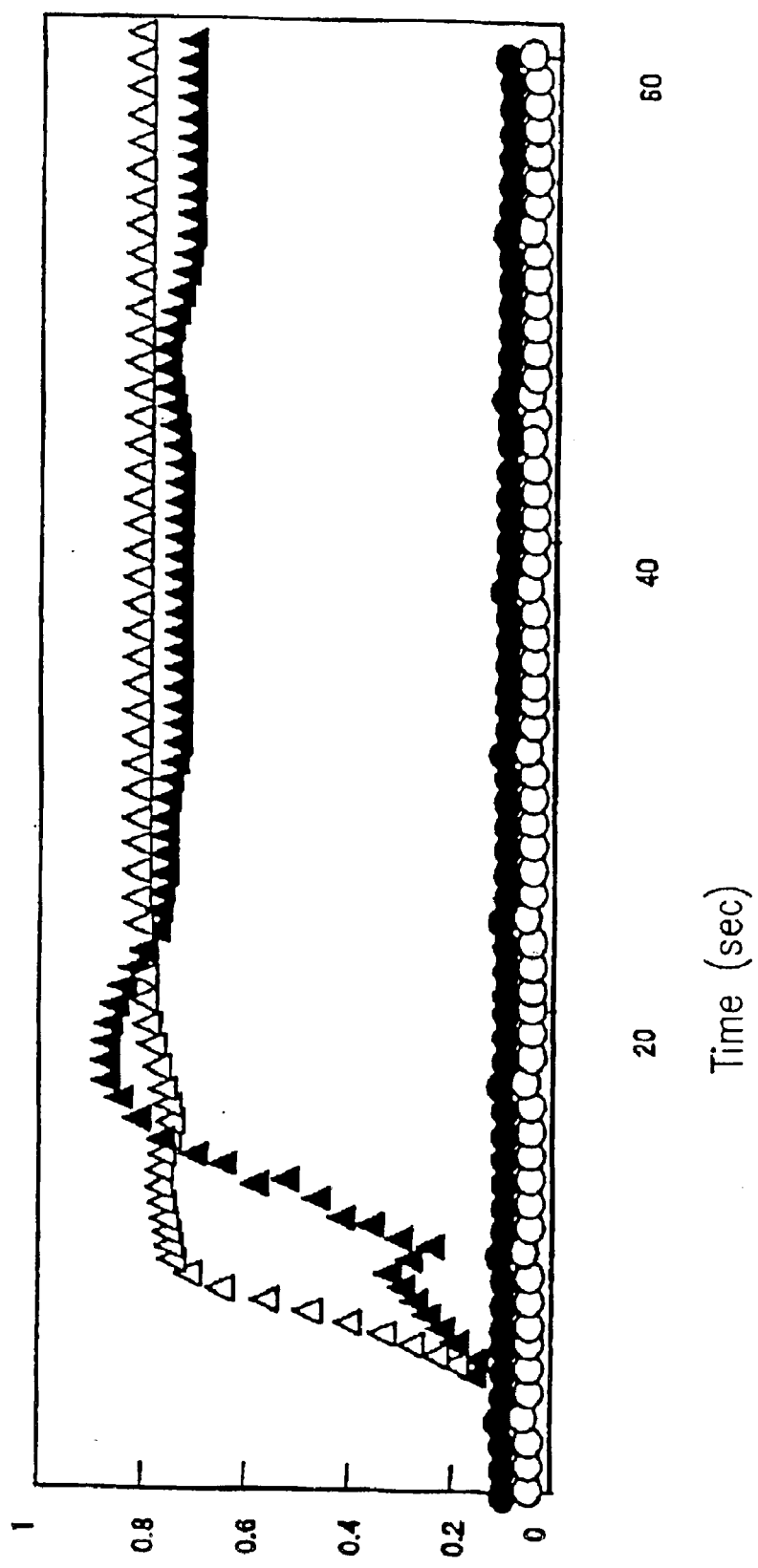

FIG. 16 is a diagram showing a response of a smooth muscle cell to norepinephrine obtained as a significant signal in accordance with the method of the present invention in a time-lapse manner.

BEST MODE FOR CARRYING OUT THE INVENTION

A significant signal extracting method according to one embodiment of the present invention is a method for extracting a signal of interest from a signal generated from at least one subject, comprising step A of sampling a time-series signal generated from the subject at a predetermined frequency or sampling rate to obtain a data group consisting of a plurality of pieces of data, step B of extracting a plurality of sets of data from the data group, each set comprising a predetermined number of pieces of data, to obtain a plurality of extracted data groups, and calculating a standard deviation of each of the plurality of extracted data groups to obtain a set of standard deviations, and a step of calculating an average of the resultant standard deviations, in which the average is regarded as a representative value of the time-series signal generated from the subject and is used as an index for obtaining the signal of interest or the significant signal.

A significant signal extracting method according to another embodiment of the present invention is a method for extracting a signal of interest from a signal generated from at least one subject, comprising step A of sampling a time-series signal generated from the subject at a predetermined frequency or sampling rate to obtain a data group consisting of a plurality of pieces of data, step B of extracting a plurality of sets of data from the data group, each set comprising a predetermined number of pieces of data, to obtain a plurality of extracted data groups, and calculating a standard deviation of each of the plurality of extracted data groups to obtain a set of standard deviations, and a step of dividing the standard deviations into a plurality of classes having a predetermined width of standard deviation as a unit, plotting each standard deviation on a coordinate system having an axis representing the class and another axis representing the number of the standard deviations present in each class, approximating a resultant graph to a normal distribution, and calculating an average, and half-width, variance or standard deviation of the resultant normal distribution, in which these values are regarded as a representative value of the time-series signal generated from the subject and are used as an index for obtaining the signal of interest or the significant signal.

Figure 1:
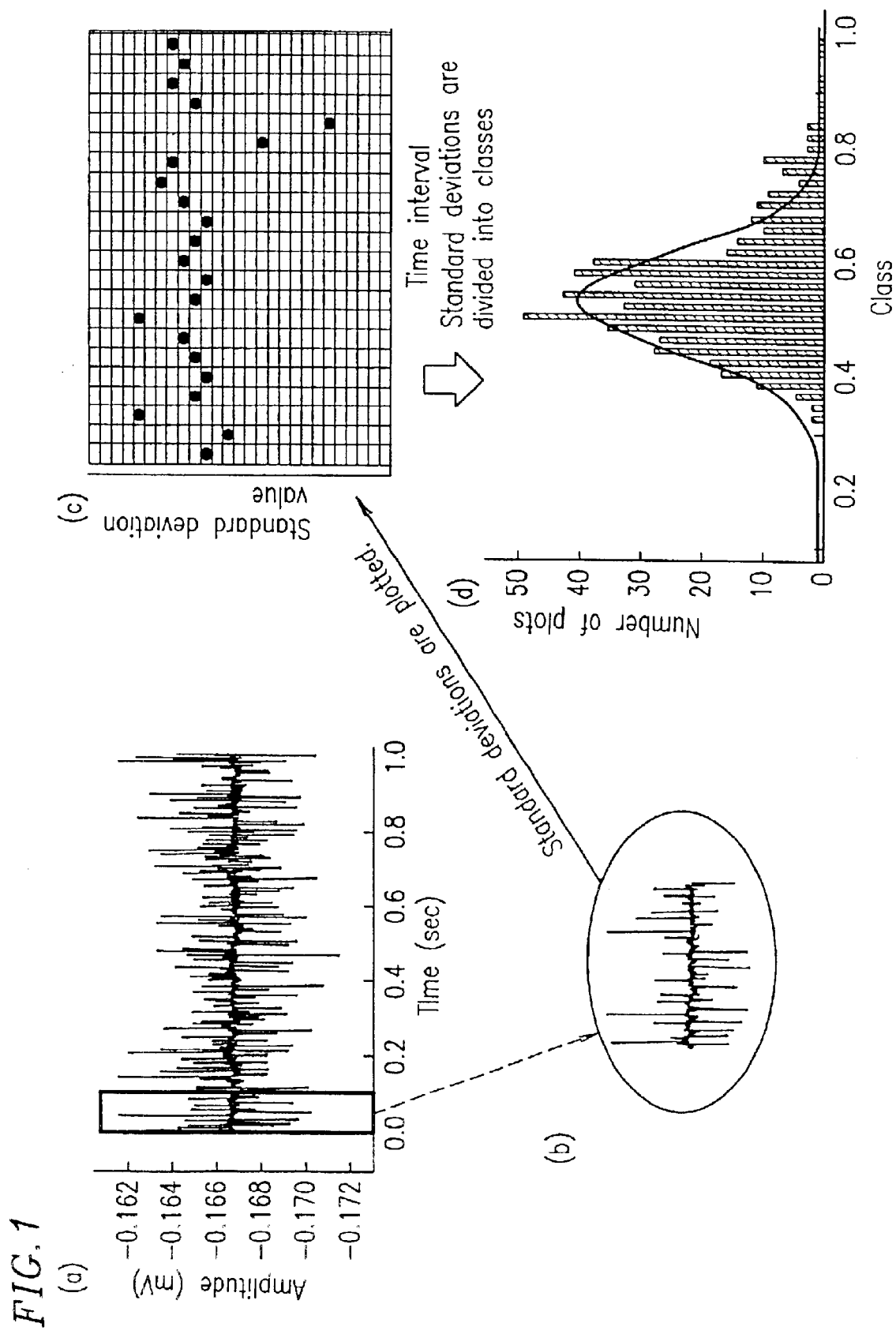
FIG. 1 is a schematic diagram indicating each step of a significant signal extracting method according to one embodiment of the present invention.

Referring to FIG. 1, a significant signal extracting method according to one embodiment of the present invention will be described. FIG. 1 is a schematic diagram for explaining the significant signal extracting method of one embodiment of the present invention. As shown in FIG. 1(*a*), a time-series signal (e.g., voltage amplitude) generated from a subject is sampled at a predetermined frequency in a time-series manner to obtain a data group consisting of a plurality of pieces of data. Next, as shown in FIG. 1(*b*), a set of data is extracted from the data group a plurality of times in a time-series manner (FIG. 1(*b*) shows one extraction), each set comprising a predetermined number of time-series pieces of data (e.g., corresponding to data spanning 5 msec). A standard deviation of each extracted data group is calculated to obtain a standard deviation group consisting of a set of standard deviations. Next, as shown in FIG. 1(*c*), the standard deviations, each of which is a member of the set of standard deviations, are divided into a plurality of classes having a predetermined width of standard deviation as a unit, and plotted (in FIG. 1(*c*), the horizontal axis represents time interval and the vertical axis represents standard deviation value). Next, as shown in FIG. 1(*d*), the standard deviation values are plotted on a coordinate system having the X axis representing the class and the Y axis representing the number of standard deviations in each class and a resultant graph is approximated to a normal distribution. Finally, an average, and half-width, variance or standard deviation of the resultant normal distribution is calculated. These values are regarded as a representative value of the time-series signal generated from the subject and are used as an index for obtaining the signal of interest or the significant signal.

A significant signal extracting method according to another embodiment of the present invention is a method for extracting a signal of interest from a signal generated from at least one subject, comprising step A of sampling a time-series signal generated from the subject at a predetermined frequency or sampling rate to obtain a data group consisting of a plurality of pieces of data, step B of extracting a plurality of sets of data from the data group, each set comprising a predetermined number of pieces of data, to obtain a plurality of extracted data groups, and calculating a standard deviation of each of the plurality of extracted data groups to obtain a set of standard deviations, and a step of dividing the standard deviations into a plurality of classes having a predetermined width of standard deviation as a unit, plotting each standard deviation on a coordinate system having an axis representing the class and another axis representing the number of the standard deviations present in each class, approximating a resultant graph by curvilinear approximating analysis selected from the group consisting of exponential decreasing analysis, exponential increasing analysis, Gaussian distribution, Lorentz distribution, σ analysis, multiple peak analysis, and nonlinear analysis, and obtaining each parameter value of the resultant approximated curve (an X offset value, a Y offset value, a time constant, an amplification coefficient, a center, a width, an exponential, power, a start value y of Y ($-\infty$), and an end value of Y ($+\infty$)), in which any one of these parameters is regarded as a representative value of the time-series signal generated from the subject and is used as an index for obtaining the signal of interest or the significant signal.

In the embodiment of the present invention, the procedure from step B to the step of plotting standard deviations may be repeated while changing the number of pieces of data in one set of data in the extracted data group and the interval of the histogram class, thereby improving the precision of the resultant index value.

In the embodiment of the present invention, a plurality of subjects may be used and data groups obtained from time-series signals generated from the subjects may be added or subtracted, thereby improving the precision of a resultant index value.

In the embodiment of the present invention, the method may further comprise a step of simultaneously stimulating the subjects, thereby improving the precision of a resultant index value or obtaining a significant signal for the stimulus.

In the embodiment of the present invention, one set of data in the extracted data group may be extracted by time-series or random selection.

In the embodiment of the present invention, step B may be repeated. Start data may be designated a. A first extracted data group consisting of a predetermined number of time-series pieces of data may be extracted from the data group. A standard deviation of each first extracted data group may be calculated. Start data b may be sampled a predetermined time after the data a. A second extracted data group consisting of a predetermined number of time-series pieces of data may be extracted from the data group. A standard deviation of each second extracted data group may be calculated.

In the embodiment of the present invention, step B may be repeated. Start data may be designated a. A first extracted data group consisting of a predetermined number of time-series pieces of data may be extracted from the data group. A standard deviation of each first extracted data group may be calculated. A first standard deviation group consisting of a plurality of standard deviations may be obtained. Start data b may be sampled a predetermined time after the data a. A second extracted data group consisting of a predetermined number of time-series pieces of data may be extracted from the data group. A standard deviation of each second extracted data group may be calculated. A second standard deviation group consisting of a plurality of standard deviations may be obtained. Each of the first and second standard deviation groups is divided into a plurality of classes having a predetermined width of standard deviation as a unit, and the standard deviations are plotted in a coordinate system having an axis representing the class and another axis representing the number of standard deviations present in each class. A resultant graph may be approximated to a normal distribution. The average, and half-width, variance or standard deviation of the resultant normal distribution may be calculated. These values are regarded as a representative value of the time-series signal generated from the subject and are used as an index for obtaining the signal of interest or the significant signal.

A significant signal extracting method according to another embodiment of the present invention is a method for extracting a signal of interest from a signal generated from at least one subject, comprising step A of sampling a time-series signal generated from the subject at a predetermined frequency or sampling rate to obtain a data group consisting of a plurality of pieces of data, step B of extracting a plurality of sets of data from the data group, each set comprising a predetermined number of pieces of data, to obtain a plurality of extracted data groups, and calculating a standard deviation of each of the plurality of extracted data groups to obtain a set of standard deviations, step C of extracting a predetermined number of standard deviations from the standard deviation group in a time-series manner a plurality of times to obtain a plurality of extracted standard deviation groups and calculating an average of the predetermined number of standard deviations and a time-series increase rate of the average, step D of identifying a time (a) of generation of a time-series signal corresponding to a time when the average of the extracted standard deviations reaches a predetermined set value, step E of identifying a time (b) of generation of a time-series signal corresponding to a time when the increase rate of the average of the extracted standard deviation group after the time (a) reaches a predetermined set value, step F of calculating an average of the standard deviations at the time (b), and step G of obtaining a significant signal based on a change rate and variation of the standard deviation from the times (a) and (b). By obtaining the significant signal based on the change rate and variation of the standard deviation, it is possible to quantitatively assess an inherent activity of a drug. Moreover, it is possible to compare activities between different drugs and compare activity expression speed.

EXAMPLES

Hereinafter, examples of the present invention will be described with reference to drawings.

Example 1

Figure 2:
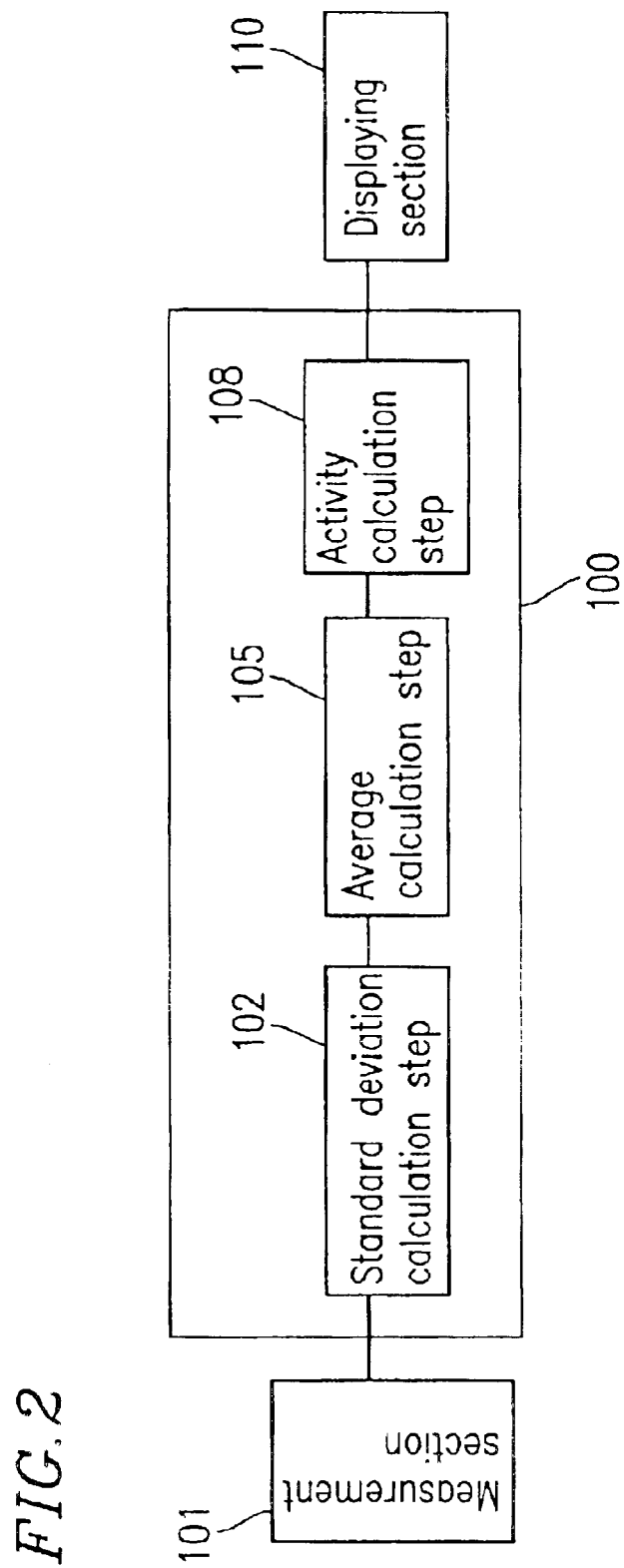
FIG. 2 is a schematic diagram showing a configuration of an apparatus and steps used in measurement of ion channel activities of a cell described in an example of the present invention. Reference numerals in the figure indicate the following: 100 computer: 101 measurement section; 102 standard deviation calculation step: 105 average calculation step; 108 activity calculation step; 110 displaying section.

FIG. 2 is a schematic diagram showing a configuration of an apparatus and steps used in a signal extracting method according to Example 1 of the present invention. The apparatus comprises a measurement section 101 for continuously measuring action potential generated from a neuron; a computer 100 incorporating a hard disk storing a program for executing a standard deviation calculation step 102 for calculating a standard deviation of measured data every predetermined time, an average calculation step 105 for calculating an average of standard deviation values output every predetermined time, and an activity calculation step 108 for calculating an ion channel activity from an average output from the average calculation step 105; and a data displaying section 110, such as CRT, for displaying the ion channel activity.

The apparatus was used to measure an electrical signal of a neuron which was actually prepared from *Lymnaea stagnails* where 0, 0.1, 0.3, 1, 3, 10, 30, or 100 $\mu$M glutamate was applied to the neuron. The resultant measured data spanning 10 milliseconds was divided into pieces of subdata spanning 100 milliseconds, for each of which a standard deviation was in turn calculated. The average of the standard deviations was plotted in FIG. 6. In the ion channel activity extracting method of this example, a result dependent on glutamate concentration was confirmed. In other words, the greater the glutamate concentration, the further right the distribution of the standard deviation value of 100 milliseconds, i.e., the greater the standard deviation value of 100 milliseconds. Further, it was shown that the total ion channel activities are estimated from the data.

Example 2

Figure 3:
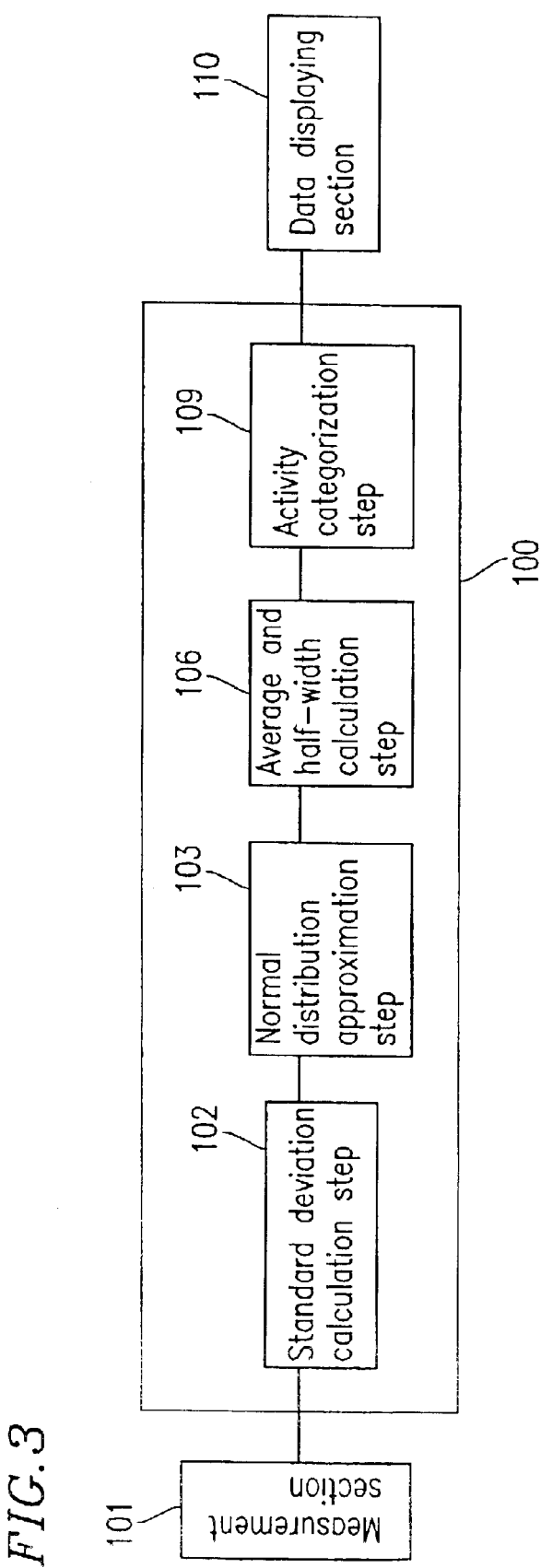
FIG. 3 is a schematic diagram showing a configuration of an apparatus and steps used in measurement of ion channel activities of a cell described in another example of the present invention. Reference numerals in the figure indicate the following: 100 computer, 101 measurement section; 102 standard deviation calculation step; 103 normal distribution approximation step; 106 average and half-width calculation step; 109 activity categorization step; and 110 data displaying section.

FIG. 3 is a schematic diagram showing a configuration of an apparatus and steps used in a signal extracting method according to Example 2 of the present invention. The apparatus comprises a measurement section 101 for continuously measuring action potential generated from a neuron; a computer 100 incorporating a hard disk storing a program for executing a standard deviation calculation step 102 for calculating a standard deviation of measured data every predetermined time, a normal distribution approximation step 103 for dividing a standard deviation group consisting of a plurality of resultant standard deviations into a plurality of classes having a predetermined width of standard deviation as a unit, and plotting each standard deviation on a coordinate system in which X axis represents the class and Y axis represents the number of the standard deviations existing in each class, an average and half-width calculation step 106 for approximating the resultant graph to a normal distribution, and calculating the average and half-width of the resultant normal distribution, and an activity categorization step 109 for categorizing an ion channel activity based on the resultant average and half-width; and a data displaying section 110, such as CRT, for displaying the ion channel activity.

The apparatus was used to perform extracellular recording of a neuron which was actually prepared from *Lymnaea stagnails* where the measurement was conducted before and after applying 50 $\mu$M glutamate to the neuron. A group of standard deviations obtained by the measurement were plotted on a graph shown in FIG. 7 where the horizontal axis represents class. FIG. 7(*a*) is a histogram showing standard deviation values calculated every 5 milliseconds before the application of glutamate. FIG. 7(*b*) is a histogram showing standard deviation values calculated every 5 milliseconds after the application of glutamate. As indicated in these figures, the averages and half-widths of graphs obtained by approximating the histograms, before and after the application of glutamate, to normal distributions are 0.488 and 0.119, respectively, before the application and 0.733 and 0.170, respectively, after the application. The average of standard deviations every 5 milliseconds increases between before and after the application of glutamate. This is because the application of glutamate activates an ion channel of a *Lymnaea stagnails* neuron and the opening or closing of the activated channel causes variation of the action potential which appears on the graphs.

FIG. 8 shows a histogram of standard deviation values every 5 milliseconds where data obtained by a conventional intracellular recording method was subjected to similar signal processing. The curve to the left in FIG. 8 is a histogram of standard deviation values every 5 milliseconds before application of glutamate. The curve to the right in FIG. 8 is a histogram of standard deviation values every 5 milliseconds after the application of glutamate. As indicated in these figures, the averages and half-widths of graphs obtained by approximating the histograms, before and after the application of glutamate, to normal distributions are 0.181 and 0.041, respectively, before the application and 0.534 and 0.204, respectively, after the application. Comparing between the results of FIGS. 7 and 8, the result of the extracellular recording method is similar to that of the intracellular recording method.

Thus, instead of conventional intracellular recording, the signal extracting method of this example can be used to simply measure and extract, and categorize the cellular activity associated with the opening or closing of an ion channel. In this configuration, by comparing the absolute values of ion channel activities or an increase or decrease in ion channel activity before and after applying a drug to a cell or with respect to the amount of the drug, an ion channel activity of a cell can be detected and an effect of a drug can be qualitatively or quantitatively categorized.

Example 3

Intracellular recording methods and the like have revealed that the activity of the Ca ion channel of smooth muscle cells is inhibited by nifedipine in a concentration-dependent manner when the cell is stimulated by 10 $\mu$M norepinephrine. Therefore, the effect of nifedipine on the Ca ion channel (0.03 to 30 $\mu$M), which was recorded by the intracellular recording method, was used as database and data obtained by measuring two Ca-channel inhibitors by extracellular recording was also referenced to categorize drugs using the same signal activity extracting method as in Example 2. Specifically, data obtained by intracellular recording was plotted by two variables, i.e., a deviation of the average of the normal distribution of standard deviations from a reference value (relative shift value) and a deviation of the half-width thereof from a reference value (relative spread). The plotting result was used as database. This database was used to categorize the effects of two drugs (compounds A and B). The activity of a Ca ion channel of a smooth muscle cell was measured by extracellular recording while the concentrations of the drugs A and B were changed in the range of 0.03 to 30 $\mu$M. The result was shown in FIG. 9. In FIG. 9, triangles indicate compound A. As shown in FIG. 9, compound A behaves in substantially the same manner as that of nifedipine (circles). Therefore, compound A is highly likely to be a Ca ion channel inhibitor similar to nifedipine. In contrast, compound B indicated by squares in FIG. 9 has substantially no changes irrespective of changes in the concentration of compound B, so that compound B is highly probably not a Ca ion channel blocker which is different from conventional Ca channel blockers against smooth muscle cells.

As described above, the signal extracting method of this example makes it possible to deduce the effect of an unknown drug. Moreover, for example, drugs maybe assessed using a threshold indicated by a dashed circle indicating that the above-described relative shift and relative spread are each within about 5% as shown in FIG. 9, thereby making it possible to screen drugs efficiently.

Example 4

An effect of 1 $\mu$M tetrodotoxin (TTX) on a neuron prepared from Lymnaea stagnails was studied by an extracellular recording method where 50 $\mu$M glutamate was simultaneously applied to the neuron. The ion channel activity of the neuron was extracted by the same ion channel activity extracting method as in Example 2. The result is shown in FIG. 10. Graph b is a graph obtained by approximating standard deviation values every 5 milliseconds before the application of glutamate to a normal distribution. Graph c is a graph obtained by approximating standard deviation values every 5 milliseconds after the application of glutamate to a normal distribution. Graph a is a graph obtained by approximating standard deviation values every 5 milliseconds to a normal distribution where TTX was allowed to act for 10 minutes, followed by application of glutamate. As shown in FIG. 10, the addition of 50 $\mu$M glutamate caused the average of the distribution to be shifted toward the right along the horizontal axis, and the half-width increased. On the other hand, the action of 1 $\mu$M TTX caused the average of the distribution to be shifted along the horizontal axis toward the left further than the control, and the half-width decreased. Thus, as in Example 2, the signal activity extracting method of this example makes it possible to qualitatively or quantitatively categorize an effect of a drug. Further, by additionally employing the half-width of an approximating normal distribution as a factor for categorization of an effect of a drug, the effect of a drug can be more minutely classified.

Example 5

Smooth muscle cells derived from rat aorta vessels were used to measure effects of various Ca channel blockers by an extracellular recording method. The resultant data was processed by the same signal extracting method as in Example 2 to determine ion channel activities.

The extracellular recording was performed using an extracellular recording electrode having 100 through holes having a diameter of 5 $\mu$m, each of which was provided in a pit having a diameter of 20 $\mu$m and a depth of 20 $\mu$m formed, in a 2 mm×2 mm area on a silicon substrate. One smooth muscle cell was held on each of the 100 through holes, and suctioned from the rear side to fix the cell for measurement. Measuring electrodes were provided on the rear side of the silicon substrate by gold deposition so that an electrical change associated with the opening or closing of a channel of a cell could be detected. The cells prepared on the extracellular recording electrode in the above-described manner were treated with a Ca channel blocker, i.e., each of $\omega$-CgTxMVIIC (P/Qtype), nifedipine (Ltype) and $\omega$-CgTxGVIA (N type). In this situation, effects of noradrenaline on the smooth muscle cells were compared and the result is shown in FIG. 11. Five curves in FIG. 11 represent responses to application of the following respective drugs in the order of peak positions from the left: 1 $\mu$M nifedipine (L type Ca channel inhibitor)+50 $\mu$M noradrenaline (thick dashed line), no drug (control) (alternate long and short dash line), 1 $\mu$M $\omega$-CgTxMVIIC (P/Q type Ca channel inhibitor)+50 $\mu$M noradrenaline (thick chain double dashed line), 1 $\mu$M $\omega$-CgTxGVIA (N type Ca channel inhibitor)+50 $\mu$M noradrenaline (dashed line), and 50 $\mu$M noradrenaline (solid line).

Thus, characteristic deviation values were approximated by normal distributions to obtain graphs depending on each type of blocker.

By employing the signal extracting method of Example 5 and comparing the absolute values of ion channel activities or an increase or decrease in ion channel activity before and after applying a drug to a cell or with respect to the amount of the drug, an ion channel activity of a cell can be detected and an effect of a drug can be qualitatively or quantitatively categorized.

Example 6

Samples obtained by double digesting DNA derived from E. coli with Eco RI and Hind III (producing fragment products A to H) were used as specimens. As indicated in FIG. 12, probes complementary to the double digested products (single-stranded DNA) were placed on a slide glass. On row A, probes obtained by replacing 0 to 5 bases of a base sequence complementary to a single-stranded DNA of product A with other bases were fixed in the order of 0 to 5 from the left. On row B, probes obtained by replacing 0 to 5 bases of a base sequence complementary to a single-stranded DNA of product B with other bases were fixed in a similar manner. On rows C to H, probes obtained by replacing 0 to 5 bases of a base sequence complementary to a single-stranded DNA of products C to H with other bases were fixed in a similar manner. Thereafter, reaction rings corresponding to all rows and columns on the slide glass was provided, a DNA sample derived from E. coli was dropped on the slide glass where the sample was obtained by double digesting the DNA with Eco RI and Hind III and making it single stranded by heating at 100° C. An indicator, which reacts with double-stranded DNA, such as Cyber Green I was added to each reaction ring. In this situation, fluorescence measurement was performed while the temperature was increased from 5° C. up to 80° C. every 5 minutes.

FIG. 13 shows time-series variations in fluorescence strength on row C sampled at a sampling rate of 10 kHz. As indicated in FIG. 13, the smaller the number of replaced bases, i.e., the greater the hybridization, the greater the fluorescence strength. The same is true of the products provided on rows A, B, and D to H. The fluorescence strength data for row C obtained for 5 minutes from 45 minutes to 50 minutes after the start of the measurement were approximated to normal distributions by the same method as in Example 2 and the results are shown in FIG. 14 for comparison. As described in FIG. 14, the smaller the number of replaced bases, i.e., the greater the hybridization, the greater the gradients before and after peaks of the approximating normal distribution curves or the half-widths, variances or standard deviations of the normal distributions. As a result, it was found that the signal processing of the present invention can detect the difference in an ability of forming double strands due to one base difference.

Thus, it was revealed that the significant signal extracting method of the present invention can very effectively assess not only cellular activities but also changes in physical properties, i.e., DNA diagnostics, SNP analysis, and the like.

Example 7

Smooth muscle cells derived from rat aorta vessels were cultured on a specially treated semiconductor substrate.

The semiconductor substrate has 100 through holes, each of which has a diameter of 5 $\mu$m with the pitch of the through holes being 30 $\mu$m, in an area of 1 mm². A surface of the semiconductor substrate was coated with 0.01% (w/v) collagen type I solution (Sigma C8919) at a density of 10 $\mu$g/cm$^2$, which was in turn allowed to react at 37° C. for 30 minutes, followed by air drying. Smooth muscle cells derived from rat aorta vessels were cultured on the substrate cleansed with sterilized water. After three days of the culture, the following experiment was conducted.

When measuring ion channel activity, the vessel smooth muscle cells were suctioned by applying a predetermined pressure from the rear side of the semiconductor substrate so that the cells were made to contact the semiconductor substrate. The smooth muscle cells were stimulated with 10 $\mu$M norepinephrine. In an experimental system, the smooth muscle cells were stimulated with 10 $\mu$M norepinephrine, and potential changes were measured for 60 seconds. The resultant time-series data was approximated to a normal distribution by the method in Example 2. The average of the normal distribution is plotted on the graph shown in FIG. 15. Note that the collection of time-series data was started 10 milliseconds after the start of the experiment, so that measured data was not extracted for the time lag. Thereafter, standard deviations were calculated every 100 milliseconds from the time-series data, thereby clearly extracting ion channel activities due to the stimulant. As a result, it was found that the resultant plots were clearly shifted toward higher class values than when no drug was applied, as shown in FIG. 15. Note that the average shift could be clearly extracted when the time lag was less than 50 milliseconds, however, conversely, the time lag of 50 milliseconds or more made the activity extraction invalid. This is the result of this experimental system. It is believed that use of other cells and other stimulants may lead to respective particular characteristics.

Example 8

The same experiment as in Example 7 was conducted, except that 10 $\mu$M norepinephrine stimulation was performed in the optional presence of 10 $\mu$M prazosin ($\alpha$1 blocker) as an inhibitor. In the experimental system, smooth muscle cells were first stimulated with 10 $\mu$M norepinephrine and the potential changes thereof were measured for 60 milliseconds. In this case, as shown in FIG. 16, an average of standard deviation every 100 milliseconds of time-series data spanning one second average was plotted with a filled triangle. Further, an average of standard deviation every 100 milliseconds of one-second time-series data, sectioned with a time shift of 10 milliseconds, was plotted with an open triangle. Next, filled circles and open circles indicate data obtained when smooth muscle cells were treated with 10 $\mu$M prazosin for 10 minutes before being stimulated with 10 $\mu$M norepinephrine and similar signal processing was performed. An open circle indicates an average of standard deviation every 100 milliseconds of one-second time-series data with a time shift of 10 milliseconds, and corresponds to a result indicated by a filled triangle. As a result, it was indicated that by processing time-series data with a time shift, reactions against a stimulant may be clearly captured. The result of Example 8 indicates a possibility that the method can identify the types of channels having a timing of activity varying depending on a stimulus. Moreover, it is suggested that the method can determine the strength of a stimulant or an inhibitor by setting an arbitrary threshold for an average of standard deviations.

As described above, the significant signal extracting method of the present invention divides in various manners a digital signal captured at a predetermined sampling rate or frequency, thereby making it possible to extract, measure and categorize a significant signal associated with a biological reaction from noise.

Even when the fluorescence strength of a fluorescence image is captured as a digital signal by a CCD camera, but no change in fluorescence strength is observed, the significant signal extracting method of the present invention can extract, measure and categorize a slight change in not only biological, but also chemical or physical signals.

Figure 4:
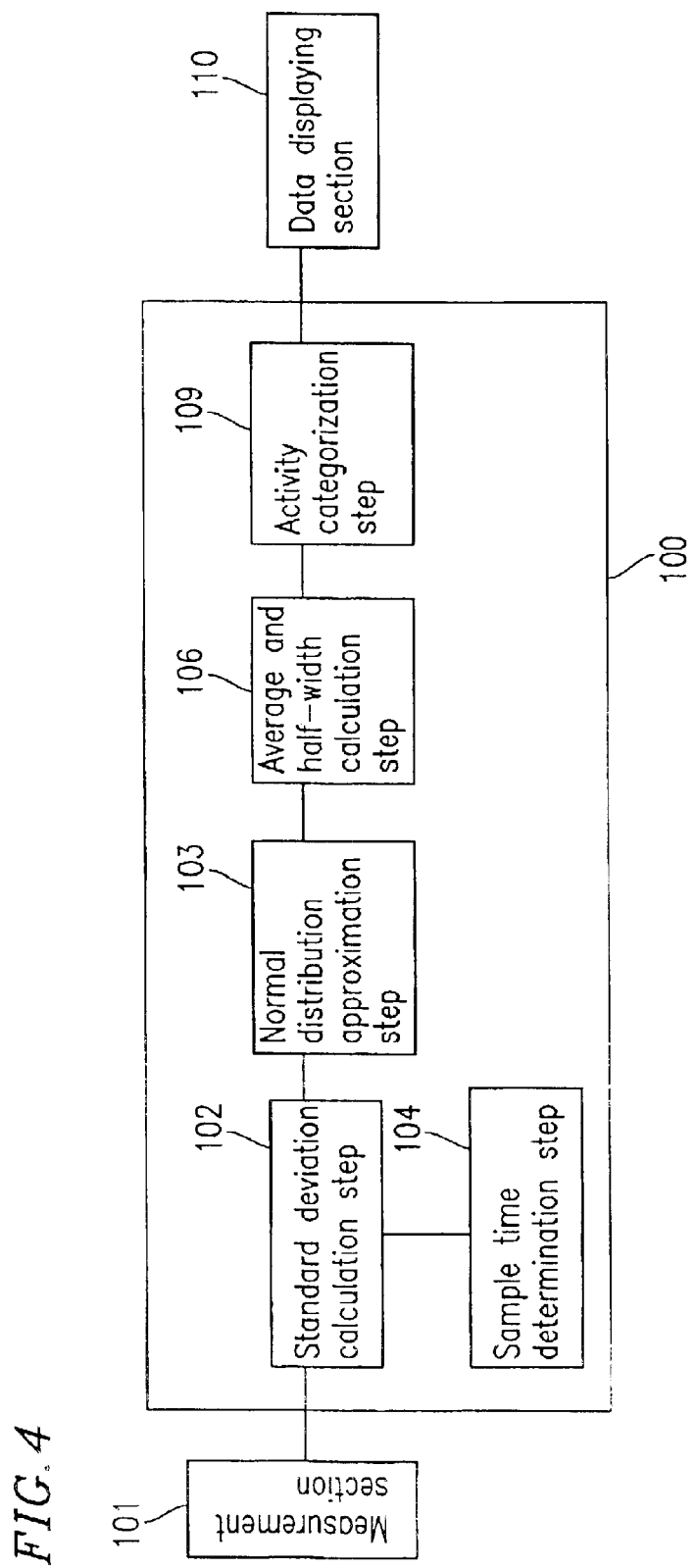
FIG. 4 is a schematic diagram showing a configuration of an apparatus and steps used in measurement of ion channel activities of a cell described in still another example of the present invention. Reference numerals in the figure indicate the following: 100 computer; 101 measurement section; 102 standard deviation calculation step; 103 normal distribution approximation step; 104 sample time determination step; 106 average and half-width calculation step; 109 activity categorization step; and 110 data displaying section.

Note that although the configuration of the apparatus and the steps schematically shown in FIG. 2 or 3 are employed in the above-described examples, a configuration of an apparatus and steps shown in FIG. 4 or 5 may instead be employed.

FIG. 4 is a schematic diagram showing a configuration of an apparatus and steps used in a signal extracting method according to another example of the present invention. The apparatus comprises a measurement section 101 for continuously measuring action potential generated from a neuron; a computer 100 incorporating a hard disk storing a program for executing a standard deviation calculation step 102 for calculating a standard deviation of measured data every predetermined time, a sample time determination step 104 for determining a time for calculating a standard deviation, a normal distribution approximation step 103 for dividing a standard deviation group consisting of a plurality of resultant standard deviations into a plurality of classes having a predetermined width of standard deviation as a unit, and plotting each standard deviation on a coordinate system in which X axis represents the class and Y axis represents the number of the standard deviations existing in each class, an average and half-width calculation step 106 for approximating the resultant graph to a normal distribution, and calculating the average and half-width of the resultant normal distribution, and an activity categorization step 109 for categorizing an ion channel activity based on the resultant average and half-width; and a data displaying section 110, such as CRT, for displaying the ion channel activity.

FIG. 5 is a schematic diagram showing a configuration of an apparatus and steps used in a signal extracting method according to still another example of the present invention. The apparatus comprises a stimulus generation section 111 for stimulating a neuron; a plurality of measurement sections 101 for continuously measuring action potential generated from the neuron; a signal adding up section 107 for adding up signals obtained by the measurement sections 101; a computer 100 incorporating a hard disk storing a program for executing a standard deviation calculation step 102 for calculating a standard deviation of measured data every predetermined time, a normal distribution approximation step 103 for dividing a standard deviation group consisting of a plurality of resultant standard deviations into a plurality of classes having a predetermined width of standard deviation as a unit, and plotting each standard deviation on a coordinate system in which X axis represents the class and Y axis represents the number of the standard deviations existing in each class, an average and half-width calculation step 106 for approximating the resultant graph to a normal distribution, and calculating the average and half-width of the resultant normal distribution, and an activity categorization step 109 for categorizing an ion channel activity based on the resultant average and half-width; and a data displaying section 110, such as CRT, for displaying the ion channel activity.

As described above, the present invention is described with reference to the examples, but the present invention is not limited to them. Other embodiments including variations, alterations, and modifications can be carried out based on the knowledge of those skilled in the art without departing from the scope of the present invention.

INDUSTRIAL APPLICABILITY

The present invention provides a method for extracting a significant signal from a signal which is difficult or impossible to identify. Particularly, the present invention provides a method in which a simple measurement probe which does not necessarily require a specialized control apparatus can be used to easily measure and categorize the total channel activities of a whole cell in a short time, and no chemical substance is required, so that a side effect or a change in fluorescence sensitivity over time does not have to be considered, and a method applicable for drug screening.

The significant signal extracting method of the present invention can be applied to drug screening, DNA analysis, protein analysis, DNA and protein functional analysis, and the like. For example, in electrophysiological cellular function measurement, electrochemical DNA analysis, and the like, a significant signal is extracted from a signal captured as a digital signal, and measured and categorized, so that the method is very useful for high-speed drug screening. Moreover, in the DNA analysis field, hybridization analysis depending on reaction temperature can be performed in SNP analysis using a fluorescence intercalater or electrochemical measurement, so that the method is useful in the field of medicament development or DNA diagnostics.

What is claimed is:

1. A method for extracting a signal of interest from a signal generated from at least one subject, comprising the steps of:
    (A) obtaining a time-series signal generated from the subject as a data group consisting of a plurality of pieces of data;
    (B) obtaining a plurality of extracted data groups from the data group, wherein each extracted data group comprises a predetermined number of pieces of data selected from the data group;
    (C) calculating standard deviations of the plurality of extracted data groups to obtain a standard deviation group; and
    (D) referencing each standard deviation included in the standard deviation group and selecting the signal of interest,
        wherein the referencing in the step (D) is to divide the standard deviations into a plurality of classes having a predetermined width of standard deviation as a unit, plot each standard deviation on a coordinate system having an axis representing the class and another axis representing the number of the standard deviations present in each class, approximate a resultant graph to a normal distribution, and calculate an average, half-width and variance, or standard deviation of the resultant normal distribution.

2. A method for extracting a signal of interest from a signal generated from at least one subject, comprising the steps of:
    (A) obtaining a time-series signal generated from the subject as a data group consisting of a plurality of pieces of data;
    (B) obtaining a plurality of extracted data groups from the data group, wherein each extracted data group comprises a predetermined number of pieces of data selected from the data group;
    (C) calculating standard deviations of the plurality of extracted data groups to obtain a standard deviation group; and
    (D) referencing each standard deviation included in the standard deviation group and selecting the signal of interest,
    further comprising performing the steps (B) to (C) a plurality of times while changing the number of pieces of data included in the extracted data group.

3. A method according to claim 2 wherein the referencing in the step (D) is to calculate an average of the standard deviations included in the standard deviation group.

4. A method according to claim 1, further comprising performing the steps (B) to (D) a plurality of times while changing the number of pieces of data included in the extracted data group and the width of the class, wherein the signal of interest is selected from averages, half-widths and variances or standard deviations of a plurality of resultant normal distributions.

5. A method according to claim 2, wherein the signal of interest is extracted from signals generated from a plurality of subjects, and after the step (A), the method further comprises adding up a data group obtained for each of the plurality of subjects.

6. A method according to claim 2, wherein the signal of interest is extracted from signals generated from a plurality of subjects, and after the step (A), the method further comprises subtracting a data group obtained for each of the plurality of subjects.

7. A method according to claim 2, wherein the signal of interest is extracted from signals generated from a plurality of subjects, and before the step (A), the method further comprises simultaneously stimulating each of the plurality of subjects.

8. A method for extracting a signal of interest from a signal generated from at least one subject, comprising the steps of:
    (A) obtaining a time-series signal generated from the subject as a data group consisting of a plurality of pieces of data;
    (B) obtaining a plurality of extracted data groups from the data group, wherein each extracted data group comprises a predetermined number of pieces of data selected from the data group;
    (C) calculating standard deviations of the plurality of extracted data groups to obtain a standard deviation group; and
    (D) referencing each standard deviation included in the standard deviation group and selecting the signal of interest,
        wherein the referencing in the step (D) is to divide the standard deviations into a plurality of classes having a predetermined width of standard deviation as a unit, plot each standard deviation on a coordinate system having an axis representing the class and another axis representing the number of the standard deviations present in each class, approximate a resultant graph by curvilinear approximating analysis selected from the group consisting of exponential decreasing analysis, exponential increasing analysis, Gaussian distribution, Lorentz distribution, $\sigma$ analysis, multiple peak analysis, and nonlinear analysis, and obtain gradients before and after a peak on a resultant approximated curve.

9. A method according to claim 2, wherein the selection in the step (B) is performed in a time-series manner.

10. A method for extracting a signal of interest from a signal generated from at least one subject, comprising the steps of:
    (A) obtaining a time-series signal generated from the subject as a data group consisting of a plurality of pieces of data;

(B) obtaining a plurality of extracted data groups from the data group, wherein each extracted data group comprises a predetermined number of pieces of data selected from the data group;

(C) calculating standard deviations of the plurality of extracted data groups to obtain a standard deviation group; and (D) referencing each standard deviation included in the standard deviation group and selecting the signal of interest, wherein the referencing in the step (D) is to calculate an average of the standard deviations included in the standard deviation group, and the steps (B) to (D) are repeated, the selection in the step (B) is performed in a time-series manner, and the method further comprise selecting a first piece of data in the extracted data group with a predetermined time lag in each repetition and comparing averages of the standard deviation groups obtained in the repetitions.

11. A method according to claim 1, wherein the steps (B) to (D) are repeated, the selection in the step (B) is performed in a time-series manner, and the method further comprises selecting a first piece of data in the extracted data group with a predetermined time lag in each repetition and comparing averages of normal distributions of the standard deviation groups obtained in the repetitions.

12. A method according to claim 1, wherein the steps (B) to (D) are repeated, the selection in the step (B) is performed in a time-series manner, and the method further comprises selecting a first piece of data in the extracted data group with a predetermined time lag in each repetition and comparing half-widths, variances or standard deviations of normal distributions of the standard deviation groups obtained in the repetitions.

13. A method for extracting a signal of interest from a signal generated from at least one subject, comprising the steps of:

(A) obtaining a time-series signal generated from the subject as a data group consisting of a plurality of pieces of data;

(B) obtaining a plurality of extracted data groups from the data group, wherein each extracted data group comprises a predetermined number of pieces of data selected from the data group;

(C) calculating standard deviations of the plurality of extracted data groups to obtain a standard deviation group; and (D) referencing each standard deviation included in the standard deviation group and selecting the signal of interest, wherein the referencing in the step (D) comprises obtaining a plurality of extracted standard deviation groups from the standard deviation group, each extracted standard deviation group comprising a predetermined number of standard deviations selected from the standard deviation group in a time-series manner, and the method further comprises the steps of:

calculating an average of the predetermined number of standard deviations and a time-series increase rate of the average;

comparing the resultant average of each extracted standard deviation group with a predetermined set value;

identifying a time (a) of generation of a time-series signal corresponding to the standard deviation group having an average greater than or equal to the set value;

identifying a time (b) of generation of a time-series signal corresponding to the standard deviation group having a time-series increase rate of an average of extracted standard deviation group after the time (a) smaller than or equal to the set value; and obtaining a significant signal based on the generation times (a) and (b).

14. A method for extracting a signal of interest from a signal generated from at least one subject, comprising the steps of:

(A) obtaining a time-series signal generated from the subject as a data ground consisting of a plurality of pieces of data;

(B) obtaining a plurality of extracted data groups from the data group, wherein each extracted data group comprises a predetermined number of pieces of data selected from the data group;

(C) calculating standard deviations of the plurality of extracted data groups to obtain a standard deviation group; and (D) referencing each standard deviation included in the standard deviation group and selecting the signal of interest.

wherein the subject is a cell, and the signal of interest is a signal associated with activation of an ion channel or a receptor, or actuation of an intracellular signal transduction system.

15. A method for extracting a signal of interest from a signal generated from at least one subject, comprising the steps of:

(A) obtaining a time-series signal generated from the subject as a data group consisting of a plurality of pieces of data;

(B) obtaining a plurality of extracted data groups from the data group, wherein each extracted data group comprises a predetermined number of pieces of data selected from the data group;

(C) calculating standard deviations of the plurality of extracted data groups to obtain a standard deviation group; and (D) referencing each standard deviation included in the standard deviation group and selecting the signal of interest, wherein the subject is a cell, the signal of interest is a significant signal generated from the cell responsive to a test chemical substance, and the step (A) is performed either in the presence of a standard chemical substance having a known action to the cell or in the presence of the test chemical substance, and the method further comprises comparing the average obtained in the presence of the standard chemical substance with the average obtained in the presence of the test chemical substance.

16. A method for extracting a signal of interest from a signal generated from at least one subject, comprising the steps of:

(A) obtaining a time-series signal generated from the subject as a data group consisting of a plurality of pieces of data;

(B) obtaining a plurality of extracted data groups from the data group, wherein each extracted data group comprises a predetermined number of pieces of data selected from the data group;

(C) calculating standard deviations of the plurality of extracted data groups to obtain a standard deviation groups; and (D) referencing each standard deviation included in the standard deviation group and selecting the signal of interest.
  wherein the subject is a cell, the signal of interest is a significant signal generated from the cell responsive to a test chemical substance, and
the step (A) is performed either in the presence of a standard chemical substance having a known action to the cell or in the presence of the standard chemical substance and the test chemical substance, and the method further comprises comparing the average obtained in the presence of the standard chemical substance with the average obtained in the presence of the standard chemical substance and the test chemical substance.

17. A method for extracting a signal of interest from a signal generated from at least one subject comprising the steps of:
(A) obtaining a time-series signal generated from the subject as a data group consisting of a plurality of pieces of data;
(B) obtaining a plurality of extracted data groups from the data group, wherein each extracted data group comprises a predetermined number of pieces of data selected from the data group;
(C) calculating standard deviations of the plurality of extracted data groups to obtain a standard deviation groups; and
(D) referencing each standard deviation included in the standard deviation group and selecting the signal of interest,
  wherein the subject is nucleic acid, and the signal of interest is a significant signal associated with formation of double stranded nucleic acid.

18. A computer-readable recording medium storing a program for executing the procedures of:
(A) obtaining a time-series signal generated from the subject as a data group consisting of a plurality of pieces of data;
(B) obtaining a plurality of extracted data groups from the data group, wherein each extracted data group comprises a predetermined number of pieces of data selected from the data group;
(C) calculating standard deviations of the plurality of extracted data groups to obtain a standard deviation group; and
(D) referencing each standard deviation included in the standard deviation group and selecting the signal of interest,
  wherein the steps (B) to (C) are performed a plurality of times while changing the number of pieces of data included in the extracted data group.

19. A program for causing a computer to execute the procedures of:
(A) obtaining a time-series signal generated from the subject as a data group consisting of a plurality of pieces of data;
(B) obtaining a plurality of extracted data groups from the data group, wherein each extracted data group comprises a predetermined number of pieces of data selected from the data group;
(C) calculating standard deviations of the plurality of extracted data groups to obtain a standard deviation group; and
(D) referencing each standard deviation included in the standard deviation group and selecting the signal of interest,
wherein the steps (B) to (C) are performed a plurality of times while changing the number of pieces of data included in the extracted data group.

* * * * *

UNITED STATES PATENT AND TRADEMARK OFFICE
CERTIFICATE OF CORRECTION

| | |
|---|---|
| PATENT NO. | : 6,999,905 B2 |
| APPLICATION NO. | : 10/296007 |
| DATED | : February 14, 2006 |
| INVENTOR(S) | : Ogawa et al. |

It is certified that error appears in the above-identified patent and that said Letters Patent is hereby corrected as shown below:

On the Title Page, Item [30] Foreign Application Priority Data should be inserted after Item [22] to read -- Japanese Application No. 2001-131411 filed 27 April 2001 --.

At Claim 17, column 19, line 17:

"one subject comprising" should read "one subject, comprising"

Signed and Sealed this

Eighth Day of January, 2008

JON W. DUDAS
*Director of the United States Patent and Trademark Office*